(12) United States Patent
Kawasaki et al.

(10) Patent No.: US 11,171,334 B2
(45) Date of Patent: Nov. 9, 2021

(54) POSITIVE-ELECTRODE ACTIVE MATERIAL FOR NON-AQUEOUS ELECTROLYTE SECONDARY BATTERY AND METHOD FOR PRODUCING SAME

(71) Applicant: NICHIA CORPORATION, Anan (JP)

(72) Inventors: Tomooki Kawasaki, Anan (JP); Kenichi Kobayashi, Tokushima (JP); Sachiko Masuda, Tokushima (JP)

(73) Assignee: NICHIA CORPORATION, Anan (JP)

( * ) Notice: Subject to any disclaimer, the term of this patent is extended or adjusted under 35 U.S.C. 154(b) by 432 days.

(21) Appl. No.: 16/142,784

(22) Filed: Sep. 26, 2018

(65) Prior Publication Data

US 2019/0097226 A1 Mar. 28, 2019

(30) Foreign Application Priority Data

Sep. 28, 2017 (JP) .............................. JP2017-188519

(51) Int. Cl.
*H01M 4/505* (2010.01)
*H01M 4/525* (2010.01)
*H01M 10/0525* (2010.01)
*C01G 53/00* (2006.01)
*H01M 4/02* (2006.01)

(52) U.S. Cl.
CPC ............ *H01M 4/505* (2013.01); *C01G 53/54* (2013.01); *H01M 4/525* (2013.01); *H01M 10/0525* (2013.01); *C01P 2002/32* (2013.01); *C01P 2002/50* (2013.01); *C01P 2004/03* (2013.01); *C01P 2004/51* (2013.01); *C01P 2004/61* (2013.01); *C01P 2006/12* (2013.01); *C01P 2006/40* (2013.01); *H01M 2004/021* (2013.01); *H01M 2004/028* (2013.01)

(58) Field of Classification Search
CPC .. H01M 4/505; H01M 4/525; H01M 10/0525; C01G 53/54
USPC ....................................... 429/218.1, 223, 224
See application file for complete search history.

(56) References Cited

U.S. PATENT DOCUMENTS

| 2012/0135315 A1* | 5/2012 | Niina ................. | C01G 45/1228 |
| | | | 429/332 |
| 2015/0270537 A1 | 9/2015 | Kato et al. | |
| 2016/0064733 A1* | 3/2016 | Aso ......................... | C01G 33/00 |
| | | | 429/223 |

FOREIGN PATENT DOCUMENTS

| JP | 2015179616 A | 10/2015 | |
| JP | 5928445 B2 | 5/2016 | |
| JP | 2016076454 A | 5/2016 | |
| JP | 2017084521 A | * 5/2017 | ............. H01M 4/36 |
| JP | 2017084521 A | 5/2017 | |
| WO | 2012121220 A1 | 9/2012 | |
| WO | WO-2016056586 A1 | * 4/2016 | ............. H01M 4/36 |

* cited by examiner

*Primary Examiner* — Tri V Nguyen
(74) *Attorney, Agent, or Firm* — Hunton Andrews Kurth LLP

(57) ABSTRACT

A positive-electrode active material for a non-aqueous electrolyte secondary battery is provided. The positive-electrode active material contains a lithium transition metal composite oxide having a spinel structure and containing nickel and manganese. The lithium transition metal composite oxide has a surface region containing niobium as a solid solution. A mole ratio of an amount of niobium to a total amount of nickel and manganese in the surface region decreases according to a distance from a surface in a depth direction in a region from the surface to a distance of 0.3 nm in the depth direction.

15 Claims, 2 Drawing Sheets

POSITIVE-ELECTRODE ACTIVE MATERIAL FOR NON-AQUEOUS ELECTROLYTE SECONDARY BATTERY AND METHOD FOR PRODUCING SAME

CROSS-REFERENCE TO RELATED APPLICATIONS

This application claims priority to Japanese Patent Application No. 2017-188519, filed on Sep. 28, 2017, the disclosure of which is hereby incorporated by reference in its entirety.

BACKGROUND

Field of the Invention

The present disclosure relates to a positive-electrode active material for a non-aqueous electrolyte secondary battery and a method for producing the same.

Description of the Related Art

As electronic devices such as portable phones and VTRs are reduced in size, secondary batteries serving as power supplies for these electronic devices are required to have higher energy. Non-aqueous electrolyte secondary batteries such as lithium ion secondary batteries are expected as such secondary batteries. Furthermore, non-aqueous electrolyte secondary batteries are attracting attention as batteries for power of electric vehicles etc. Lithium transition metal composite oxides such as lithium cobalt oxide, lithium nickel oxide, and lithium nickel cobalt manganese oxide are used as positive-electrode active material of lithium ion secondary batteries.

For improving characteristics of the positive-electrode active material, a technique of coating a surface of lithium transition metal composite oxide with a compound of various elements is known. For example, WO 2012/121220 describes a technique of coating a surface of lithium nickel cobalt manganese oxide with an oxide containing niobium, which is considered to provide excellent cycle characteristics and rate characteristics. Japanese Laid-Open Patent Publication No. 2015-179616 describes a technique of coating a surface of lithium nickel manganese oxide with lithium niobate, which is considered to provide excellent charge-discharge cycle characteristics.

SUMMARY

A first aspect of the present disclosure provides a positive-electrode active material for a non-aqueous electrolyte secondary battery which contains a lithium transition metal composite oxide having a spinel structure and containing nickel and manganese. The lithium transition metal composite oxide has a surface region containing niobium as a solid solution. A mole ratio of an amount of niobium to a total amount of nickel and manganese in the surface region decreases according to a distance from a surface in a depth direction in a region from the surface to a distance of 0.3 nm in the depth direction.

A second aspect of the present disclosure provides a method for producing a positive-electrode active material for a non-aqueous electrolyte secondary battery. The method includes providing a base material that contains a lithium transition metal composite oxide having a spinel structure and containing nickel and manganese; bringing the base material into contact with a sol or solution containing niobium to obtain a niobium adhesion material; and performing a heat treatment of the niobium adhesion material at a temperature higher than 500° C. to obtain a heat-treated material.

DETAILED DESCRIPTION

Figure 1:
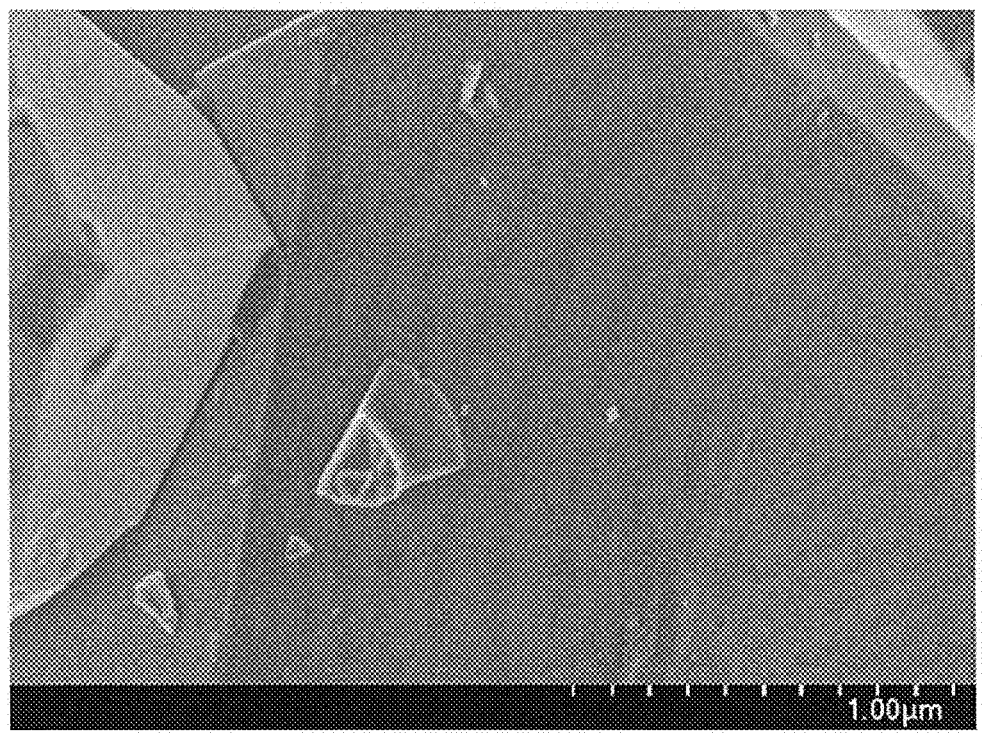
FIG. 1 shows a scanning electron microscope (SEM) image of a lithium transition metal composite oxide serving as a base material.

The term "step" as used herein includes not only an independent step but also a step not clearly distinguishable from another step as long as the intended purpose of the step is achieved. If multiple substances correspond to a component in a composition, the content of the component in the composition means the total amount of the multiple substances present in the composition unless otherwise specified.

Positive-Electrode Active Material for Non-Aqueous Electrolyte Secondary Battery A positive-electrode active material for a non-aqueous electrolyte secondary battery contains a lithium transition metal composite oxide having a spinel structure and containing nickel and manganese. The lithium transition metal composite oxide has a surface region containing niobium as a solid solution. In the surface region, a mole ratio (Nb/(Ni+Mn)) of an amount of niobium to a total amount of nickel and manganese decreases according to a distance from a surface in a depth direction in a region from the surface to a distance of 0.3 nm in the depth direction.

When a non-aqueous electrolyte secondary battery includes a positive electrode containing as a positive-electrode active material a lithium transition metal composite oxide with a surface region containing niobium as a solid solution, the battery can satisfy both favorable output characteristics and cycle characteristics. In the surface region containing niobium as a solid solution, the content ratio of niobium decreases according to the distance from the surface in the depth direction. Therefore, it is considered that the surface region containing niobium as a solid solution and a core region substantially not containing niobium are continuously formed in the lithium transition metal composite oxide. It is generally known that cycle characteristics of a non-aqueous electrolyte secondary battery are improved by applying a lithium transition metal composite oxide having a coating layer containing niobium to a positive electrode material. However, in the lithium transition metal composite oxide according to the present embodiment, the output characteristics are improved in addition to the improvement in the cycle characteristics. This may be because, for example, as compared to when a solid solution of niobium is present in the entire core region or when a niobium compound such as oxide adheres to or covers the surface of the lithium transition metal composite oxide, the surface region has the concentration of niobium increasing from the inside in the direction toward the surface, the surface region acts not only as a protective region for electrolyte but also as a region facilitating diffusion of lithium.

The surface region of the lithium transition metal composite oxide contains niobium as a solid solution. Containing niobium as a solid solution means a state in which niobium is dissolved into a crystal structure of the lithium transition metal composite oxide and means that niobium is not in a state of a niobium compound such as an oxide adhering to the surface of the lithium transition metal composite oxide.

In the surface region of the lithium transition metal composite oxide containing niobium as a solid solution, the mole ratio of the amount of niobium to the total amount of nickel and manganese (hereinafter also simply referred to as "the mole ratio") decreases according to the distance from the surface in the depth direction (hereinafter also referred to as "the depth from the surface"). Therefore, the amount of niobium present in the surface region is nonuniform, and niobium is distributed such that the amount is the largest on the surface. The depth from the surface associated with the decrease in the mole ratio may be at least 0.3 nm, preferably 0.4 nm or more, more preferably 0.5 nm or more, and may be, for example, 1 nm or less, preferably 0.6 nm or less. The decreasing rate of the mole ratio may be, for example, 0.14 or more, preferably 0.2 or more, more preferably 0.4 or more, further preferably 0.5 or more per 1 nm of depth. The upper limit of the decreasing rate may be, for example, 2.0 or less, preferably 1.5 or less, more preferably 1 or less. The depth from the surface is defined as a minimum value of a distance between a point inside the lithium transition metal composite oxide and the surface.

In the lithium transition metal composite oxide, the mole ratio of the amount of niobium to the total amount of nickel and manganese in the outermost surface may be, for example, 0.1 or more, preferably 0.2 or more, more preferably 0.25 or more. The upper limit of the mole ratio in the surface may be, for example, less than 1, preferably 0.8 or less, more preferably 0.7 or less, further preferably 0.4 or less. The mole ratio in the surface within the range tends to provide better output characteristics.

The mole ratio of the amount of niobium to the total amount of nickel and manganese in the surface region can be obtained as follows, for example. A solution of ascorbic acid capable of dissolving nickel, manganese, and niobium is prepared at a predetermined concentration. The lithium transition metal composite oxide is put into and partially dissolved in the solution, and the elution amounts of nickel, manganese, and niobium were respectively measured to calculate the mole ratio (Nb/(Ni+Mn)) as the mole ratio of a region from a surface of an undissolved material to a surface of a partially-dissolved material. Separately, the lithium transition metal composite oxide is completely dissolved to measure the total elution amount of nickel, manganese, and niobium. To obtain an average particle diameter of the partially dissolved material, the average particle diameter of the undissolved lithium transition metal composite oxide is multiplied by a ratio of an amount acquired by subtracting the elution amount of the partially dissolved material from the total elution amount to the total elution amount. The depth from the surface is obtained as ½ of the difference between the average particle diameter of the undissolved lithium transition metal composite oxide and the average particle diameter of the partially dissolved material. Therefore, the mole ratio in the partially dissolved material is a mole ratio from the surface of the undissolved material to the depth corresponding to the average particle diameter of the partially dissolved material. By changing the concentration of the ascorbic acid solution used for partial dissolution, the elution amount of the partially dissolved material is adjusted to calculate the mole ratio and the depth from the surface in each case. The relationship of the mole ratio relative to the depth from the surface is linearly approximated by using the depth from the surface as the x axis and the mole ratio as the y axis, and the decreasing ratio of the mole ratio is calculated as an absolute value of a slope of a straight line. The mole ratio of the undissolved material in the surface is calculated as the y-intercept of the straight line, and the thickness of the surface region containing niobium as a solid solution is calculated as the x-intercept. In calculation of the mole ratio, the lithium transition metal composite oxide is preliminarily treated with a 1.8 mass % citric acid buffer to measure an amount of niobium derived from a niobium compound adhering to the surface and a niobium source used for solid solution, and this amount is used as a blank amount of niobium for correction.

The content of niobium contained in the lithium transition metal composite oxide may be, for example, 0.1 mol % or more and 5 mol % or less, preferably 0.3 mol % or more and 3 mol % or less, more preferably 0.5 mol % or more and 2 mol % or less, based on the base composition of the lithium transition metal composite oxide. The content of niobium within the range tends to provide better output characteristics.

The BET specific surface area of the lithium transition metal composite oxide may be, for example, 0.5 $m^2/g$ or more and 1.5 $m^2/g$ or less, preferably 0.6 $m^2/g$ or more and 1.3 $m^2/g$ or less, more preferably 0.7 $m^2/g$ or more and 1.2 $m^2/g$ or less. The BET specific surface area within the range tends to provide better output characteristics. The BET specific surface area is measured by a gas adsorption method using nitrogen gas, for example.

The volume average particle diameter of the lithium transition metal composite oxide may be, for example, 1 μm or more and 20 μm or less, preferably 3 μm or more and 12 μm or less. The volume average particle diameter within the range tends to provide better output characteristics. The volume average particle diameter is obtained as a particle diameter corresponding to a cumulative volume of 50% from the smallest particle diameter in a particle diameter distribution measured under a wet condition by using a laser diffraction particle diameter distribution measuring apparatus, for example.

The lithium transition metal composite oxide has a spinel structure and contains at least nickel and manganese as transition metal. The number of moles of nickel relative to the total number of moles of nickel and manganese in the composition of the lithium transition metal composite oxide may be, for example, 0.15 or more and 0.30 or less, preferably 0.17 or more and 0.28 or less, more preferably 0.20 or more and 0.25 or less. The content ratio of lithium to the total number of moles of nickel and manganese may be, for example, 0.5 or more and 0.65 or less. The content ratio of oxygen atoms to the total number of moles of nickel and manganese may be, for example, 1.8 or more and 2.2 or less. The lithium transition metal composite oxide may contain at least one element selected from the group consisting of Al, Mg, Si, Ti, Cr, Fe, Co, Cu, Zn, and Ga in addition to lithium, nickel, and manganese.

The lithium transition metal composite oxide preferably may have a composition represented by following Formula (I), for example.

$$Li_xNi_pMn_qNb_rM^1{}_sO_4 \qquad (I)$$

In the formula, 1≤x≤1.3, 0.3≤p≤0.6, 1.2≤q≤1.7, 0.001≤r≤0.05, 0≤s≤0.2, and p+q+r+s≤2, and $M^1$ is at least one selected from the group consisting of Al, Mg, Si, Ti, Cr, Fe, Co, Cu, Zn, and Ga.

In the formula (I), from the viewpoint of output characteristics, x may be preferably 1.05 or more, more preferably 1.1 or more. Preferably, x may be 1.25 or less, more preferably 1.2 or less. Preferably, p may be 0.35 or more, more preferably 0.4 or more. Preferably, p may be 0.55 or less, more preferably 0.5 or less. Preferably, q may be 1.3 or more, more preferably 1.4 or more. Preferably, q may be 1.65 or less, more preferably 1.6 or less. Preferably, r may be 0.003 or more, more preferably 0.005 or more. Preferably, r may be 0.03 or less, more preferably 0.02 or less. Preferably, s may be 0.03 or more, more preferably 0.05 or more. Preferably, s may be 0.15 or less, more preferably 0.10 or less.

The lithium transition metal composite oxide described above can be produced by a producing method described later, for example. The content of the lithium transition metal composite oxide in a positive-electrode active material for a non-aqueous electrolyte secondary battery may be, for example, 80 mass % or more, preferably 90 mass % or more.

Electrode for Non-Aqueous Electrolyte Secondary Battery

An electrode for a non-aqueous electrolyte secondary battery includes a collector and a positive-electrode active material layer disposed on the collector and containing the positive-electrode active material for a non-aqueous electrolyte secondary battery described above. A non-aqueous electrolyte secondary battery including this electrode can satisfy both favorable output characteristics and cycle characteristics.

Examples of the material of the collector include aluminum, nickel, and stainless steel. The positive-electrode active material layer is formed by applying onto the collector a positive electrode mixture obtained by mixing the positive-electrode active material, a conductive material, a binder, etc. together with a solvent, and then performing a drying treatment, a pressure treatment, etc. Examples of the conductive material include natural graphite, artificial graphite, and acetylene black. Examples of the binder include polyvinylidene fluoride, polytetrafluoroethylene, and polyamide acrylic resin.

Non-Aqueous Electrolyte Secondary Battery

The non-aqueous electrolyte secondary battery includes the electrode for a non-aqueous electrolyte secondary battery. The non-aqueous electrolyte secondary battery includes a negative electrode for a non-aqueous electrolyte secondary battery, a non-aqueous electrolyte, a separator, etc., in addition to the electrode for a non-aqueous electrolyte secondary battery. The negative electrode, the non-aqueous electrolyte, the separator, etc. appropriately usable in the non-aqueous electrolyte secondary battery are described in Japanese Laid-Open Patent Publication Nos. 2002-075367, 2011-146390, 2006-12433 which are incorporated herein by reference in their entirety, for example.

Method for Producing Positive-Electrode Active Material for Non-Aqueous Electrolyte Secondary Battery A method for producing a positive-electrode active material includes a base material providing step of providing a base material that contains a lithium transition metal composite oxide having a spinel structure and containing nickel and manganese, an adhesion step of bringing the base material into contact with a sol or solution containing niobium to obtain a niobium adhesion material, and a heat treatment step of performing a heat treatment of the niobium adhesion material at a temperature higher than 500° C. to obtain a heat-treated material. The heat treatment of the niobium adhesion material at a specific temperature enables efficient production of the positive-electrode active material capable of constituting a non-aqueous electrolyte secondary battery exhibiting favorable output characteristics and cycle characteristics.

At the base material providing step, a base material is provided that contains a lithium transition metal composite oxide having a spinel structure and containing nickel and manganese. The lithium transition metal composite oxide serving as the base material may appropriately be selected from commercially available products or may be obtained by preparing a composite oxide having a desired composition and performing a heat treatment of the oxide together with a lithium compound to prepare a lithium transition metal composite oxide.

A method for obtaining a composite oxide having a desired composition may be a method including mixing raw material compounds (hydroxide, a carbonic acid compound, etc.) according to a target composition and decomposing the compounds into a composite oxide through heat treatment, a coprecipitation method including dissolving solvent-soluble raw material compounds in a solvent, achieving precipitation of precursors according to a desired composition through temperature adjustment, pH adjustment, addition of a complexing agent, etc., and heat-treating the precursors to obtain a composite oxide, etc. An example of a method for producing a base material will hereinafter be described.

A method for obtaining a composite oxide with a coprecipitation method can include a seed generation step of obtaining seed crystals by adjusting a pH etc. of a mixed aqueous solution containing metal ions in a desired configuration, a crystallization step of growing the generated seed crystals to obtain a composite hydroxide having desired characteristics, and a step of obtaining a composite oxide through heat treatment of the obtained composite hydroxide. For details of the method for obtaining a composite oxide, reference can be made to Japanese Laid-Open Patent Publication Nos. 2003-292322 and 2011-116580 etc. which are incorporated herein by reference in their entirety.

At the seed generation step, a liquid medium containing seed crystals is prepared by adjusting a pH of a mixed solution containing nickel ions and manganese ions in a desired configuration to 11 to 13, for example. The seed crystals may contain a hydroxide containing nickel and manganese at a desired ratio, for example. The mixed solution can be prepared by dissolving nickel salt and manganese salt in water at a desired ratio. Examples of the nickel salt and the manganese salt can include sulfate, nitrate, and hydrochloride. In addition to the nickel salt and the manganese salt, the mixed solution may contain other metal salts as needed. The temperature at the seed generation step can be 40° C. to 80° C., for example. The atmosphere at the seed generation step can be a low oxidation atmosphere, and the oxygen concentration is preferably maintained at 10 vol % or less, for example.

At the crystallization step, the generated seed crystals are grown to obtain a precipitate containing nickel and manganese having desired characteristics. For example, the seed crystals can be grown by adding a mixed solution containing nickel ions and manganese ions to a liquid medium containing the seed crystals while maintaining the pH at, for example, 7 to 12.5, preferably 7.5 to 12. The addition time of the mixed solution can be, for example, 1 hour to 24 hours, preferably 3 hours to 18 hours. The temperature at the crystallization step can be 40° C. to 80° C., for example. The atmosphere at the crystallization step is the same as the seed generation step.

The pH can be adjusted at the seed generation step and the crystallization step by using an acidic aqueous solution such as a sulfuric acid aqueous solution and a nitric acid aqueous solution, an alkaline aqueous solution such as a sodium hydroxide aqueous solution and ammonia water, etc.

At the step of obtaining a composite oxide, the composite hydroxide obtained at the crystallization step is heat-treated to obtain a composite oxide. The heat treatment can be performed, for example, by heating at a temperature of 500° C. or less, preferably by heating at 350° C. or less. The temperature of the heat treatment can be, for example, 100° C. or more, preferably 200° C. or more. The duration of the heat treatment can be, for example, 0.5 hours to 48 hours, preferably 5 hours to 24 hours. The atmosphere of the heat treatment may be the air or an atmosphere containing oxygen. The heat treatment can be performed by using a box furnace, a rotary kiln furnace, a pusher furnace, or a roller hearth kiln furnace, for example.

At the heat treatment step, a mixture containing lithium obtained by mixing the composite oxide and the lithium compound may be heat-treated at a temperature of 550° C. or more and 1000° C. or less to obtain a heat-treated material. The obtained heat-treated material contains a lithium transition metal oxide having a spinel structure and containing nickel and manganese.

Examples of the lithium compound mixed with the composite oxide include lithium hydroxide, lithium carbonate, and lithium oxide. The particle diameter of the lithium compound used for the mixing may be, for example, 0.1 μm or more and 100 μm or less, preferably 2 μm or more and 20 μm or less in terms of a 50% particle diameter of the cumulative particle diameter distribution based on volume.

The ratio of the total number of moles of lithium to the total number of moles of the metal elements constituting the composite oxide in the mixture may be, for example, 0.5 or more and 0.65 or less, preferably 0.55 or more and 0.63 or less. The composite oxide and the lithium compound can be mixed by using a high-speed shear mixer, for example.

The mixture may further contain metal other than lithium, nickel, and manganese. The other metal may be Al, Mg, Si, Ti, Cr, Fe, Co, Cu, Zn, Ga, etc. and is preferably at least one selected from the group consisting thereof, more preferably at least one selected from the group consisting of Al, Ti, Cr, Fe, and Co. When the mixture contains the other metal, the mixture can be obtained by mixing a simple substance or a metal compound of the other metal with the composite oxide and the lithium compound. Examples of the metal compound containing the other metal include oxide, hydroxide, chloride, nitride, carbonate, sulfate, nitrate, acetate, and oxalate.

When the mixture contains the other metal, the ratio between the total number of moles of the metal elements constituting the composite oxide to the total number of moles of the other metal may be, for example, 1:0.015 to 1:0.1, preferably 1:0.025 to 1:0.05.

The heat treatment temperature of the mixture may be, for example, 550° C. or more and 1000° C. or less, preferably 600° C. or more and 950° C. or less, more preferably 750° C. or more and 950° C. or less. Although the mixture may be heat-treated at a single temperature, the mixture can be preferably heat-treated at multiple temperatures from the viewpoint of discharge capacity at high voltage. In the case of heat treatment at multiple temperatures, for example, the heat treatment can be performed at 750° C. or more and 1000° C. or less, and then the heat treatment can be performed at 550° C. or more and less than 750° C. The duration of the heat treatment can be, for example, 0.5 hours to 48 hours, and when the heat treatment is performed at multiple temperatures, the duration can be 0.2 hours to 47 hours at each temperature.

The atmosphere of the heat treatment may be the air or an atmosphere containing oxygen. The heat treatment can be performed by using a box furnace, a rotary kiln furnace, a pusher furnace, or a roller hearth kiln furnace, for example.

The lithium transition metal composite oxide serving as the base material preferably may have a composition represented by following Formula (II), for example.

$$Li_xNi_pMn_qM^1_rO_4 \quad (II)$$

In the formula, $1 \le x \le 1.3$, $0.3 \le p \le 0.6$, $1.2 \le q \le 1.7$, $0 \le r \le 0.2$, and $p+q+r \le 2$, and $M^1$ is at least one selected from the group consisting of Al, Mg, Si, Ti, Cr, Fe, Co, Cu, Zn, and Ga.

The average particle diameter of the base material may be, for example, 1 μm or more and 20 μm or less, preferably 3 μm or more and 12 μm or less. The BET specific surface area of the base material may be, for example, 0.5 m²/g or more and 1.5 m²/g or less, preferably 0.6 m²/g or more and 1.3 m²/g or less. The BET specific surface area within the range tends to provide better output characteristics.

At the adhesion step, the prepared base material is brought into contact with a sol or solution containing niobium to obtain a niobium adhesion material having a niobium component adhering to the surface of the base material. The sol containing niobium (hereinafter also simply referred to as "niobium sol") is a dispersion material having a niobium compound such as niobium oxide and niobium hydroxide dispersed in a liquid medium. An average primary particle diameter of the niobium sol may be, for example, 0.01 nm or more and 10 nm or less, preferably 0.1 nm or more and 5 nm or less. The concentration of the niobium compound in the niobium sol may be, for example, 2 mass % or more and 30 mass % or less, preferably 5 mass % or more and 25 mass % or less. The liquid medium constituting the niobium sol contains water, for example, and may further contain a dispersant such as ammonia and an organic acid as needed. The niobium sol may be appropriately selected from commercially products available from Taki Chemical Co., Ltd., for example, or may be prepared as a niobium sol having a desired composition.

The solution containing niobium (hereinafter also simply referred to as "niobium solution") is a solution of a niobium compound such as niobium oxalate and niobic acid dissolved in a liquid medium such as water. The concentration of the niobium compound in the niobium solution may be, for example, 2 mass % or more and 30 mass % or less, preferably 5 mass % or more and 25 mass % or less.

The contact between the base material and the niobium sol or niobium solution may be made by putting the base material into the niobium sol or the niobium solution with stirring as needed or by adding the niobium sol or the niobium solution while stirring the base material. The temperature at the time of the contact between the base material and the niobium sol or the niobium solution may be, for example, 0° C. or more and 100° C. or less, preferably 10° C. or more and 80° C. or less. The duration of contact may be, for example, 0.1 minutes or more and 120 minutes or less, preferably 1 minute or more and 60 minutes or less.

The fluid volume of the niobium sol or the niobium solution brought into contact with the base material may be a fluid volume at which the amount of niobium contained in the niobium sol or the niobium solution becomes, for example, 0.01 mol % or more and 5 mol % or less relative to the lithium transition metal composite oxide contained in the base material and may be preferably a fluid volume at which the amount becomes 0.5 mol % or more and 2 mol % or less.

After the contact between the base material and the niobium sol or the niobium solution, a drying treatment may be performed as needed. In the drying treatment, the liquid medium contained in the niobium sol or the niobium solution is at least partially removed. For the drying treatment, for example, a mixture of the base material and the niobium sol or the niobium solution can be heat-treated at 60° C. or more and 250° C. or less. The drying treatment can also be performed by drying under reduced pressure, air drying etc.

The adhesion amount of the niobium component on the niobium adhesion material may be, for example, 0.01 mol % or more and 5 mol % or less, preferably 0.5 mol % or more and 2 mol % or less in terms of the amount of niobium relative to the lithium transition metal composite oxide contained in the base material. The adhering niobium component is a niobium compound contained in the niobium sol or the niobium solution.

At the heat treatment step, the niobium adhesion material can be heat-treated at a temperature higher than 500° C. to obtain a heat-treated material. The heat treatment at a specific temperature turns the niobium component adhering to the surface of the base material into a solid solution in the surface region of the base material. The temperature of the heat treatment may be preferably 550° C. or more, more preferably 600° C. or more. The temperature of the heat treatment may be, for example, 900° C. or less, preferably 860° C. or less, more preferably 840° C. or less, further preferably 780° C. or less.

The duration of the heat treatment may be, for example, 0.5 hours or more to 48 hours or less, preferably 1 hour or more to 24 hours or less. The heat treatment may be performed by putting the niobium adhesion material into a predetermined temperature environment or by raising the temperature of the niobium adhesion material from a normal temperature to a predetermined temperature and maintaining the temperature for a predetermined time. When the heat treatment is performed by raising the temperature, the rate of temperature rise can be 1° C./min or more and 15° C./min or less, for example. The atmosphere of the heat treatment may be the air atmosphere or an inert gas atmosphere such as nitrogen.

The average particle diameter of the heat-treated material may be, for example, 1 μm or more and 20 μm or less, preferably 3 μm or more and 12 μm or less. The BET specific surface area of the heat-treated material may be, for example, 0.5 m²/g or more and 1.5 m²/g or less, preferably 0.6 m²/g or more and 1.3 m²/g or less. The BET specific surface area within the range tends to provide better output characteristics. The ratio of the BET specific surface area of the heat-treated material to the BET specific surface area of the base material may be, for example, 0.8 or more and 1.2 or less, preferably 0.9 or more and 1.1 or less.

The heat-treated material obtained at the heat treatment step is, for example, a lithium transition metal composite oxide having a spinel structure and containing nickel and manganese with a surface region containing niobium as a solid solution, preferably has a ratio of an amount of niobium to a total amount of nickel and manganese in the surface region decreasing according to a distance from a surface in the depth direction in a region from the surface to the distance of 0.3 nm in the depth direction, and more preferably has the decreasing rate thereof equal to or greater than 0.14/nm.

The heat-treated material preferably may contain a lithium transition metal composite oxide having a composition represented by following Formula (I).

$$Li_xNi_pMn_qNb_rM^1{}_sO_4 \qquad (I)$$

In the formula, 1≤x≤1.3, 0.3≤p≤0.6, 1.2≤q≤1.7, 0.001≤r≤0.05, 0≤s≤0.2, and p+q+r+s≤2, and $M^1$ is at least one selected from the group consisting of Al, Mg, Si, Ti, Cr, Fe, Co, Cu, Zn, and Ga.

In the method for producing a positive-electrode active material, the heat-treated material obtained after the heat treatment may be subjected to a crushing treatment or may be subjected to a treatment of removing unreacted materials, by-products, etc. by washing with water etc. A dispersion treatment, a classification treatment, etc. may further be performed.

EXAMPLES

The present invention will hereinafter specifically be described with examples; however, the present invention is not limited to these examples.

Methods of measuring physical properties in the following Examples and Comparative Examples will first be described. The BET specific surface area was obtained by using a nitrogen gas adsorption method (Macsorb Model-1201 manufactured by Mountech Co., Ltd.). Regarding the average particle diameter, a volume-based cumulative particle diameter distribution was measured by using a laser diffraction particle diameter distribution measuring apparatus (SALD-3100 manufactured by Shimadzu Corporation) to obtain a particle diameter corresponding to a cumulative volume of 50% from the smallest particle diameter as an average particle diameter ($D_{50}$).

Example 1

Seed Generation Step

In a reaction tank, 30 kg of water was placed, and nitrogen gas was allowed to flow while stirring at a temperature in the tank set to 50° C. After the oxygen concentration in the space inside the reaction tank was kept at 10 vol % or less, 197 g of a 25 mass % sodium hydroxide aqueous solution was added to adjust the pH value of the solution in the reaction tank to 11 or more. Subsequently, a nickel sulfate solution and a manganese sulfate solution were mixed to prepare a mixed aqueous solution containing nickel and manganese at the mole ratio of 25:75 with the total ion concentration of nickel and manganese set to 1.7 mol/L. While stirring the solution in the reaction tank, 4.76 L of the prepared mixed aqueous solution was added to prepare a liquid medium containing seed crystals.

Crystallization Step

After the seed generation step, while the temperature was maintained at 50° C., 70% sulfuric acid was added to achieve a pH of 8.9 to 9.2. Subsequently, 452 moles of 25 mass % sodium hydroxide and 201 moles of the mixed aqueous solution were both put into a reaction tank at a constant flow rate for 18 hours or longer. The pH at this time was maintained at 7.5 to 8.5. After the materials were completely put in, 2.1 kg of a 25% mass sodium hydroxide aqueous solution was put in while maintaining the inside of the reaction tank at 50° C. The pH value in the reaction tank at this time was 11.7. An obtained hydroxide containing nickel and manganese had a 50% particle diameter $D_{50}$ of 6.0 µm. The formed precipitate was then washed with water and filtered to obtain a composite hydroxide. The obtained composite hydroxide was heat-treated at 300° C. for 12 hours in the air atmosphere to obtain a composite oxide having a composition ratio of Ni/Mn=0.25/0.75.

Synthesis Step

The obtained composite oxide and lithium carbonate were mixed at Li:(Ni+Mn)=1.1:2 to obtain a raw material mixture. The obtained raw material mixture was fired in the air at 835° C. for 11 hours and then fired at 600° C. for 4 hours to obtain a sintered body. The obtained sintered body was crushed and subjected to a dispersion treatment by a resin ball mill for 15 minutes followed by dry sieving to obtain a base material as a powder material.

This resulted in a lithium transition metal composite oxide having the BET specific surface area of 0.78 m²/g and the volume average particle diameter of 4.9 µm and represented by a formula: $Li_{1.1}Ni_{0.5}Mn_{1.5}O_4$.

Adhesion Step and Heat Treatment Step

For 900 g of the obtained lithium transition metal composite oxide, a $Nb_2O_5$ sol manufactured by Taki Chemical Co., Ltd. at a concentration of 4.2 mass % was used as a niobium source, and 105 g of the sol was dropped while stirring the lithium transition metal composite oxide with a mixer to obtain a niobium adhesion material. Subsequently, a heat treatment was performed in the air at 600° C. for 9 hours. The obtained heat-treated material was subjected to a dispersion treatment by the resin ball mill to the same volume average particle diameter as the base material after the synthesis step and subjected to dry sieving to obtain a positive-electrode active material as the Nb-treated lithium transition metal composite oxide. The obtained lithium transition metal composite oxide has the BET specific surface area of 0.79 m²/g and is represented by a composition formula: $Li_{1.1}Ni_{0.5}Mn_{1.49}Nb_{0.01}O_4$.

Examples 2 to 5

Positive-electrode active materials of Examples 2 to 5 were produced as in Example 1 except that the heat treatment temperature was changed to 700° C., 750° C., 800° C., and 830° C. respectively, as shown in Table 1.

Comparative Example 1

The base material prepared in Example 1 was used as the positive-electrode active material of Comparative Example 1.

Comparative Example 2

The positive-electrode active material of Comparative Example 2 was produced as in Example 1 except that the heat treatment temperature was changed to 350° C. as shown in Table 1.

Evaluation

Analysis of Nickel, Manganese, and Niobium in Surface Region

By using the obtained positive-electrode active materials, the niobium content in the surface region was evaluated with the following procedure.

Preparation of Acid for Analysis

After weighing 1.775 g of trisodium citrate (anhydrous) and 0.015 g of citric acid (anhydrous), the whole amounts were transferred to a 100 mL measuring flask. Pure water was added to the measuring flask to adjust the final liquid volume to 100 mL. In this way, a citric acid-based blank buffer (hereinafter referred to as a buffer A) having a pH of 7.0 was obtained.

After weighing 1.775 g of trisodium citrate (anhydrous) and 0.015 g of citric acid (anhydrous), the whole amounts were transferred to a 100 mL measuring flask. Pure water was added to the measuring flask to adjust the final liquid volume to 100 mL, and 0.015 g of ascorbic acid was then added. In this way, a citric acid-based ascorbic acid 0.015% buffer (hereinafter referred to as a buffer B) having a pH of 7.0 was obtained.

After weighing 1.775 g of trisodium citrate (anhydrous) and 0.015 g of citric acid (anhydrous), the whole amounts were transferred to a 100 mL measuring flask. Pure water was added to the measuring flask to adjust the final liquid volume to 100 mL, and 0.1 g of ascorbic acid was then added. In this way, a citric acid-based ascorbic acid 0.1% buffer (hereinafter referred to as a buffer C) having a pH of 7.0 was obtained.

Dissolution Step

After precisely weighing 10 g of the lithium transition metal composite oxide of each of Examples and Comparative Examples into a 100 ml plastic container, 20 ml of the buffer A was added to the plastic bottle container and stirred with a mix rotor to perform a dissolution treatment of the lithium transition metal composite oxide gradually from the outermost surface for 10 minutes to obtain a partially dissolved material. After completion of the dissolution treatment, the content of the plastic bottle container was taken out and filtered to remove the lithium transition metal composite oxide remaining undissolved. By using the buffer B and the buffer C, the respective dissolution treatments were performed in the same way.

Analysis Step

After collecting as a sample and diluting 1 mL of each of the filtrates obtained at the dissolution step, inductively-coupled plasma analysis was performed for quantitative analysis of elements. The contents (mol/l) of the elements were calculated based on the analysis result. Hereinafter, $C_0^{Nb}$ denotes the niobium concentration when the buffer A was used; $C_{0.015}^{Nb}$, $C_{0.015}^{Ni}$, and $C_{0.015}^{Mn}$ denote the niobium concentration, the nickel concentration, and the manganese concentration, respectively, when the buffer B was used; and $C_{0.1}^{Nb}$, $C_{0.1}^{Ni}$, and $C_{0.1}^{Mn}$ denote the niobium concentration, the nickel concentration, and the manganese concentration, respectively, when the buffer C was used.

Analysis of Nickel and Manganese Contained in Lithium Transition Metal Composite Oxide Dissolution Step After precisely weighing 0.2 g of the lithium transition metal composite oxide into a 100 mL conical beaker, 20 mL of 6 M hydrochloric acid was added and heated for dissolution for 20 minutes. After completion of dissolution, the whole amount was transferred to a 200 mL measuring flask. Pure water was added to a measuring flask to adjust the liquid volume to 200 mL, and insoluble matter was filtered.

Analysis Step

After collecting as a sample and diluting 10 mL of the filtrate obtained at the dissolution step, inductively-coupled plasma analysis was performed for quantitative analysis of elements. The concentrations (mol/l) of nickel and manganese were calculated based on the analysis result. Hereinafter, $C_1^{Ni}$ and $C_1^{Mn}$ denote the nickel concentration and the manganese concentration.

Analysis of Niobium Contained in Lithium Transition Metal Oxide

Dissolution Step

After precisely weighing 0.1 g of the lithium transition metal composite oxide into a 100 mL conical beaker, about 1.5 g of ammonium sulfate was added. After mixing, 2 mL of conc. $H_2SO_4$ was added and heated for melting for 25 minutes. After standing to cool, 5 mL of 6 M hydrochloric acid and 15 mL of pure water were added and heated for dissolution for 10 minutes. After completion of dissolution, the whole amount was transferred to a 100 mL measuring flask. Pure water was added to the measuring flask to adjust the liquid volume to 100 mL.

Analysis Step

The solution obtained at the dissolution step was subjected to inductively-coupled plasma analysis for quantitative analysis of niobium. Based on the analysis result, the niobium concentration (mol/l) was calculated. Hereinafter, $C_1^{Nb}$ denotes the niobium concentration.

The following equations were used for calculating a mole ratio $Nb/(Ni+Mn)_{0.1}$ of an amount of niobium to the total amount of nickel and manganese, an average particle diameter $D_{50}^{0.1}$ of a partially-dissolved material, and a depth $D_{depth}^{0.1}$ from a surface in a 0.1 mass % ascorbic acid solution.

$$Nb/(Ni+Mn)_{0.1}=(C_{0.1}^{Nb}-C_0^{Nb})/(C_{0.1}^{Ni}+C_{0.1}^{Mn})$$

$$D_{50}^{0.1}=D_{50}\times\{(C_1^{Nb}-C_0^{Nb}+C_1^{Ni}+C_1^{Mn})-(C_{0.1}^{Nb}-C_0^{Nb}+C_{0.1}^{Ni}+C_{0.1}^{Mn})\}/(C_1^{Nb}-C_0^{Nb}+C_1^{Ni}+C_1^{Mn})$$

$$D_{depth}^{0.1}=(D_{50}-D_{50}^{0.1})/2$$

Similar calculations were made to obtain a mole ratio $Nb/(Ni+Mn)_{0.015}$ of an amount of niobium to the total amount of nickel and manganese, an average particle diameter $D_{50}^{0.015}$ of a partially-dissolved material, and a depth $D_{depth}^{0.015}$ from a surface in a 0.015 mass % ascorbic acid solution.

Figure 4:
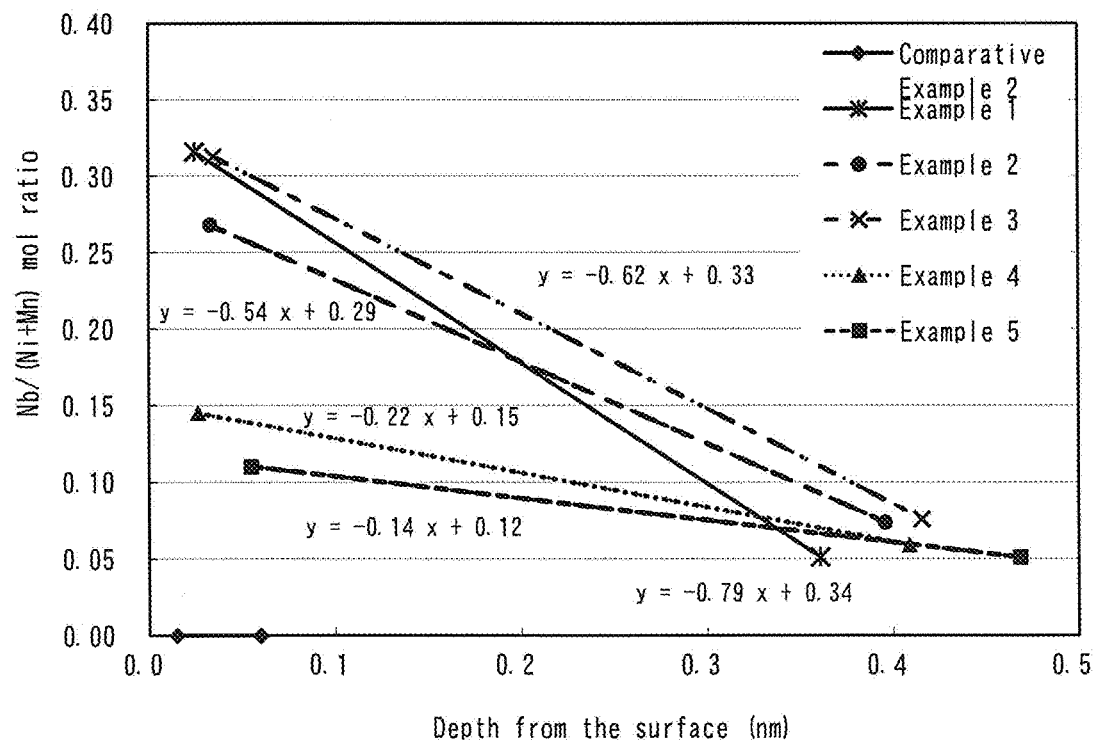
FIG. 4 shows a diagram of relationships of a mole ratio of Nb to a total amount of Ni and Mn relative to a depth from a surface of positive-electrode active materials according to a Comparative Example and Examples in the present disclosure.

FIG. 4 shows a relationship between the mole ratio of the amount of Nb to the total amount of Ni and Mn relative to the depth from the surface.

Surface Observation

Surface observation for the obtained positive-electrode active materials was performed by using a scanning electron microscope (SEM; at acceleration voltage of 1.5 kV). The results are shown in FIGS. 1 to 3.

Figure 2:
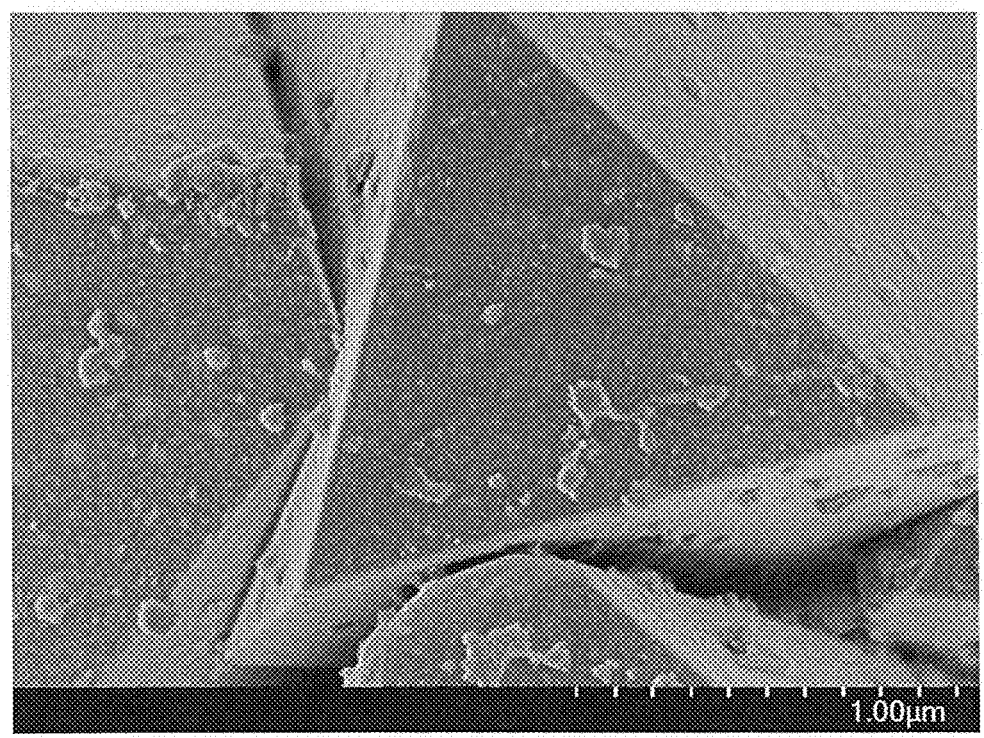
FIG. 2 shows an SEM image of a base material to which niobium adheres according to a Comparative Example in the present disclosure.
Figure 3:
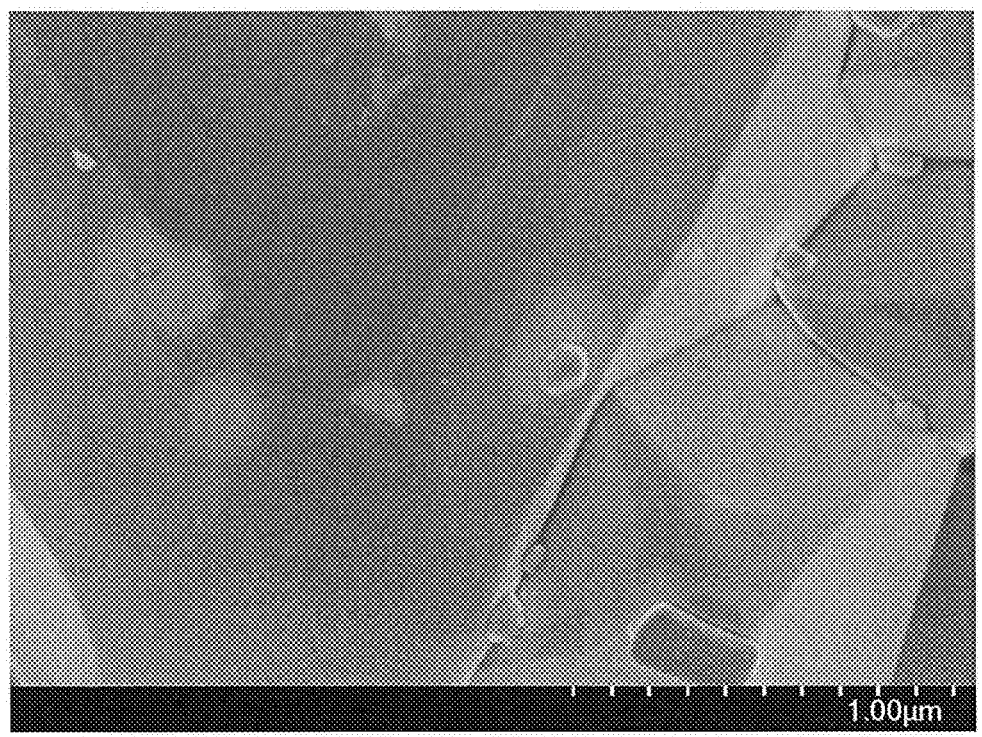
FIG. 3 shows an SEM image of a heat-treated material according to the present disclosure.

FIG. 1 shows the base material, FIG. 2 shows the positive-electrode active material of Comparative Example 2, and FIG. 3 shows a surface observation result of the positive-electrode active material of Example 2. From FIGS. 1 and 2, it can be seen that the positive-electrode active material of Comparative Example 2 has a niobium compound adhering to the surface. In FIG. 3, no niobium compound adhering to the surface is observed, and it can be seen that niobium forms a solid solution in the surface.

BET Specific Surface Area

For the obtained positive-electrode active materials, the BET specific surface area was measured. The ratio of the BET specific surface area of the heat-treated material to the base material was calculated, and the results are shown together in Table 1.

Fabrication of Evaluation Battery

By using the obtained positive-electrode active materials, an evaluation battery was fabricated with the following procedure.

Fabrication of Positive Electrode

A positive electrode mixture was prepared by dispersing 90 parts by mass of the positive-electrode active material, 5 parts by mass of acetylene black, and 5 parts by mass of polyvinylidene fluoride (PVDF) in N-methyl-2-pyrrolidone (NMP). After the obtained positive electrode mixture was applied to an aluminum foil serving as a collector and dried, compression molding by a roll press machine was followed by cutting into a predetermined size to fabricate a positive electrode.

Fabrication of Negative Electrode

A negative electrode slurry was prepared by dispersing and dissolving 97.5 parts by weight of artificial graphite, 1.5 parts by weight of CMC (carboxymethyl cellulose), and 1.0 part by weight of SBR (styrene butadiene rubber) in pure water. After the obtained negative electrode slurry was applied to a collector made of a copper foil and dried, compression molding by a roll press machine was followed by cutting into a predetermined size to fabricate a negative electrode.

Preparation of Evaluation Battery

After respective lead electrodes were attached to the collectors of the positive and negative electrodes, a separator was arranged between the positive and negative electrodes, and the separator and the electrodes were placed in a bag-shaped laminate pack. This was then dried in a vacuum at 65° C. to remove water adsorbed in the members. Subsequently, an electrolytic solution was injected into the laminate pack under an argon atmosphere and sealed to fabricate an evaluation battery. The electrolytic solution used was prepared by mixing ethylene carbonate (EC) and methyl ethyl carbonate (MEC) at a volume ratio of 3:7 and dissolving lithium hexafluorophosphate ($LiPF_6$) to the concentration of 1 mol/l. The evaluation battery obtained in this way was placed in a constant temperature bath at 25° C. and aged with a weak current before the following evaluation was performed.

Measurement of DC Internal Resistance

The evaluation battery after aging was placed under environments of 25° C. and −25° C. to measure DC internal resistance. Constant-current charge to a charge depth of 50% at a full-charge voltage of 4.75 V was followed by pulse discharge with a specific current i for 10 seconds, and a voltage V at the tenth second was measured. Intersections were plotted by using the current i on the horizontal axis and the voltage V on the vertical axis, and an inclination of a straight line connecting the intersections points was defined as DC internal resistance (DC-IR). The current i was set to 0.06 A, 0.11 A, 0.16 A, 0.21 A, and 0.26 A in the case of 25° C., and the currents i was set to 0.03 A, 0.05 A, 0.08 A, 0.105 A, and 0.13 A in the case of −25° C. The low DC-IR means that the output characteristics are favorable. The results are shown in Table 1.

Capacity Maintenance Rate

A charge/discharge cycle test was performed under a temperature condition of 60° C. In the charge/discharge cycle test, a cycle of charge/discharge includes charging to a charge upper limit voltage of 4.75 V at a constant charging current of 1.0 C (1 C=a current at which discharge is completed in one hour) and subsequent discharging to a discharge lower limit voltage of 3.5 V at a constant current of 1.0 C, and this cycle was performed 100 times in total. A discharge capacity was measured for each cycle, and a capacity maintenance factor (%) after 100 cycles was calculated by using the equation (discharge capacity at 100th cycle/discharge capacity at first cycle)×100. High durability means good life characteristics. The results are shown in Table 1.

TABLE 1

| | Heat treatment temperature (° C.) | BET specific surface area (m²/g) | BET specific surface area ratio | DC-IR (Ω) 25° C. | DC-IR (Ω) −25° C. | capacity maintenance ratio after 100 cycles (%) |
|---|---|---|---|---|---|---|
| Example 1 | 600 | 0.79 | 1.01 | 1.14 | 5.88 | 79 |
| Example 2 | 700 | 0.78 | 1.00 | 1.13 | 5.76 | 79 |
| Example 3 | 750 | 0.74 | 0.95 | 1.13 | 5.56 | 79 |
| Example 4 | 800 | 0.72 | 0.92 | 1.16 | 6.48 | 80 |
| Example 5 | 830 | 0.70 | 0.90 | 1.17 | 6.39 | 79 |
| Comparative Example 1 | — | 0.78 | — | 1.16 | 6.11 | 71 |
| Comparative Example 2 | 350 | 1.08 | 1.38 | 1.26 | 8.24 | 78 |

The evaluation batteries using the positive-electrode active materials obtained in Examples 1 to 5 are superior in capacity maintenance rate to the evaluation battery using the positive-electrode active material of Comparative Example 1 without the niobium treatment. The output characteristics are improved at both normal temperature and lower temperature in the evaluation batteries using the positive-electrode active materials obtained in Examples 1 to 5 in which the niobium adhesion material was heat-treated at a temperature of 600° C. or more, as compared to Comparative Example 2 in which the niobium adhesion material was heat-treated at 350° C.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A positive-electrode active material for a non-aqueous electrolyte secondary battery comprising a lithium transition metal composite oxide having a spinel structure and containing nickel and manganese, wherein
the lithium transition metal composite oxide has a surface region containing niobium as a solid solution, and wherein
a mole ratio of an amount of niobium to a total amount of nickel and manganese in the surface region decreases according to a distance from a surface in a depth direction in a region from the surface to a distance of at least 0.3 nm in the depth direction, at a decreasing rate of 0.4/nm or more and 0.79/nm or less.

2. The positive-electrode active material for a non-aqueous electrolyte secondary battery according to claim 1, wherein the decreasing rate is 0.5/nm or more.

3. The positive-electrode active material for a non-aqueous electrolyte secondary battery according to claim 1, wherein the mole ratio of the amount of niobium to the total amount of nickel and manganese in the surface region decreases according to a distance from the surface in the depth direction in the region from the surface to the distance of 0.5 nm in the depth direction.

4. The positive-electrode active material for a non-aqueous electrolyte secondary battery according to claim 3, wherein the decreasing rate is 0.5/nm or more and 0.79/nm or less.

5. The positive-electrode active material for a non-aqueous electrolyte secondary battery according to claim 1, wherein the mole ratio of the amount of niobium to the total amount of nickel and manganese in the surface of the lithium transition metal composite oxide is 0.1 or more.

6. The positive-electrode active material for a non-aqueous electrolyte secondary battery according to claim 1, wherein the lithium transition metal composite oxide has a BET specific surface area of 0.5 m²/g or more and 1.5 m²/g or less.

7. The positive-electrode active material for a non-aqueous electrolyte secondary battery according to claim 1, wherein the lithium transition metal composite oxide has a composition represented by the following formula:

$$Li_xNi_pMn_qNb_rM^1{}_sO_4,$$

wherein x, p, q, r, and s satisfy 1<x<1.3, 0.3<p<0.6, 1.2<q<1.7, 0.001<r<0.05, 0<s<0.2, and p+q+r+s<2, and wherein $M^1$ is at least one selected from the group consisting of Al, Mg, Si, Ti, Cr, Fe, Co, Cu, Zn, and Ga.

8. The positive-electrode active material for a non-aqueous electrolyte secondary battery according to claim 1, wherein the decreasing rate is 0.4/nm or more and less than 0.79/nm.

9. A method for producing the positive-electrode active material for a non-aqueous electrolyte secondary battery according to claim 1, comprising:
providing a base material that contains a lithium transition metal composite oxide having a spinel structure and containing nickel and manganese;
bringing the base material into contact with a sol or solution containing niobium to obtain a niobium adhesion material; and
performing a heat treatment of the niobium adhesion material at a temperature higher than 500° C. to obtain a heat-treated material.

10. The method according to claim 9, wherein the heat treatment is performed at a temperature of 600° C. or more and 780° C. or less.

11. The method according to claim 9, wherein the base material has a BET specific surface area of 0.5 m²/g or more and 1.5 m²/g or less.

12. The method according to claim 9, wherein a ratio of the BET specific surface area of the heat-treated material to the BET specific surface area of the base material is 0.8 or more and 1.2 or less.

13. The method according to claim 9, wherein an amount of niobium contained in the niobium-containing sol or solution is 0.5 mol % or more and 2 mol % or less relative to the lithium transition metal composite oxide containing nickel and manganese.

14. The method according to claim 9, wherein the decreasing rate is 0.5/nm or more and 0.79/nm or less.

15. The method according to claim 9, wherein the heat-treated material contains a lithium transition metal composite oxide having a composition represented by the following formula:

$$Li_xNi_pMn_qNb_rM^1{}_sO_4,$$

wherein x, p, q, r, and s satisfy 1<x<1.3, 0.3<p<0.6, 1.2<q<1.7, 0.001<r<0.05, 0<s<0.2, and p+q+r+s<2, and wherein $M^1$ is at least one selected from the group consisting of Al, Mg, Si, Ti, Cr, Fe, Co, Cu, Zn, and Ga.

* * * * *